(12) United States Patent
Joerg et al.

(10) Patent No.: US 6,702,357 B2
(45) Date of Patent: Mar. 9, 2004

(54) PETROL-TANK FLAP ARRANGEMENT FOR A MOTOR VEHICLE

(75) Inventors: Roland Joerg, Rottenburg (DE); Bernd Korn, Stuttgart (DE); Johann Seefried, Eutingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/207,389

(22) Filed: Jul. 30, 2002

(65) Prior Publication Data

US 2003/0062741 A1 Apr. 3, 2003

(30) Foreign Application Priority Data

Jul. 30, 2001 (DE) .......................... 101 37 035

(51) Int. Cl.$^7$ .............................................. B60K 15/05
(52) U.S. Cl. ............. 296/97.22; 220/86.2; 220/DIG. 33
(58) Field of Search ................. 296/97.22; 220/86.2, 220/DIG. 33; 292/DIG. 4, DIG. 22, 341.17, 304

(56) References Cited

U.S. PATENT DOCUMENTS

| 4,277,094 A | * | 7/1981 | Roue ....................... 296/97.22 |
| 4,782,978 A | * | 11/1988 | Appleby et al. .......... 296/97.22 |
| 5,066,062 A | * | 11/1991 | Sekulovski .............. 296/97.22 |
| 5,072,986 A | * | 12/1991 | Tai et al. ................. 296/97.22 |
| 5,533,766 A | * | 7/1996 | Farber ....................... 292/144 |
| 5,664,811 A | * | 9/1997 | Martus et al. .............. 292/144 |
| 5,836,638 A |   | 11/1998 | Slocum ................... 296/97.22 |
| 5,988,238 A | * | 11/1999 | Palvolgyi ..................... 141/312 |
| 6,234,557 B1 | * | 5/2001 | Bae .......................... 296/97.22 |
| 6,318,771 B1 | * | 11/2001 | Holloway et al. ...... 292/341.16 |
| 2002/0089187 A1 | * | 7/2002 | Holloway et al. .......... 292/199 |

FOREIGN PATENT DOCUMENTS

EP            0 846 585          6/1998

OTHER PUBLICATIONS

Robert Norton, Machine Design—An Integrated Approach, Prentice–Hall Inc., New Jersey, 1996, pp. 814–815.*

* cited by examiner

Primary Examiner—Dennis H. Pedder
Assistant Examiner—Patricia L. Engle
(74) Attorney, Agent, or Firm—Crowell & Moring LLP

(57) ABSTRACT

A petrol-tank flap arrangement for a motor vehicle has a pivotably mounted petrol-tank flap which is retained in its closed position by a locking device. The petrol-tank flap is assigned a driving device which enables the petrol-tank flap to automatically swing open into its refuelling position after the locking device is released.

22 Claims, 3 Drawing Sheets

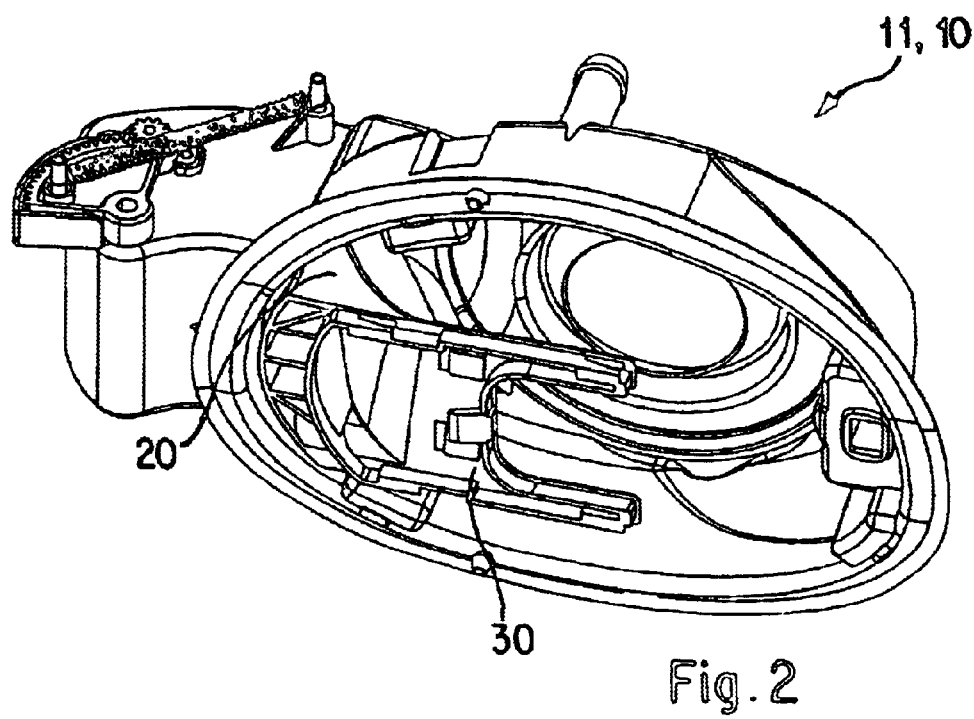
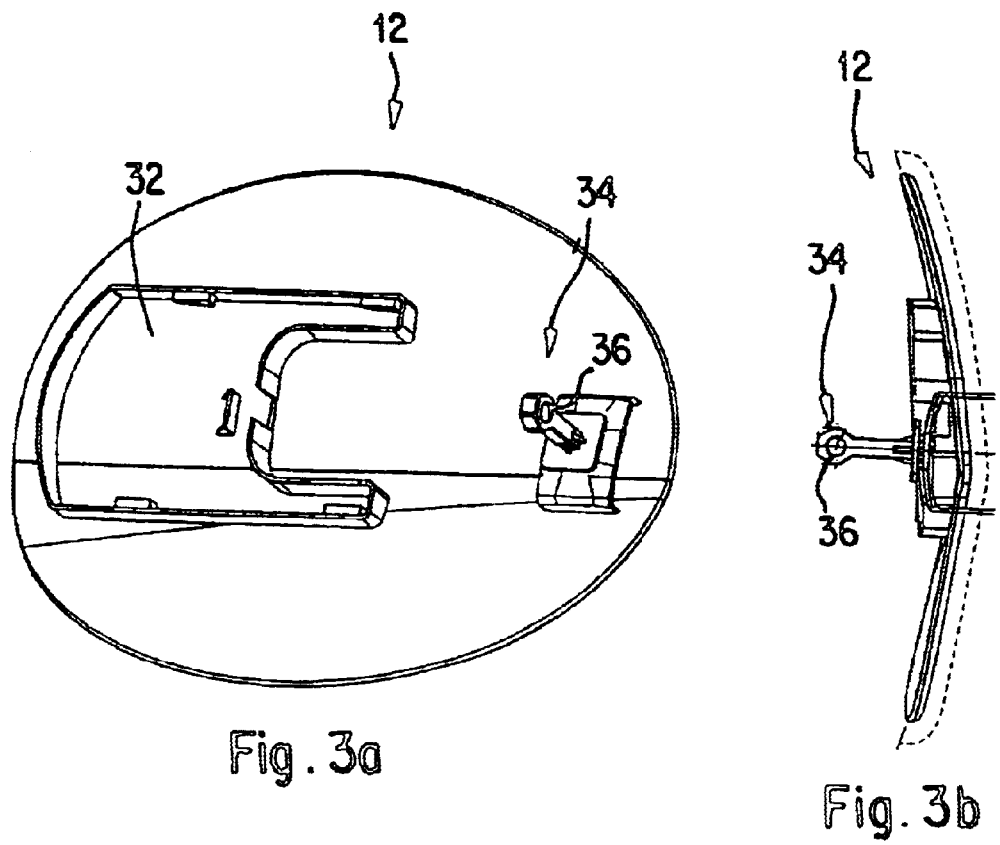

PETROL-TANK FLAP ARRANGEMENT FOR A MOTOR VEHICLE

BACKGROUND AND SUMMARY OF THE INVENTION

This application claims the priority of 101 37 035.0, filed in Germany on Jul. 30, 2001, the disclosure of which is expressly incorporated by reference herein.

The invention relates to a petrol-tank flap arrangement for a motor vehicle, having a pivotably mounted petrol-tank flap which is retained in its closed position by a locking device.

A petrol-tank flap arrangement of this type having a pivotably mounted petrol-tank flap can be inferred as already being known from European Patent Document EP 0 846 585 A2 (corresponds to U.S. Pat. No. 5,836,638). The petrol-tank flap is retained in its closed position by means of a locking device. In this case, the locking device of the petrol-tank flap comprises a "push—push lock".

An object of the invention is to provide for a motor vehicle a petrol-tank flap arrangement of the type mentioned at the beginning, the petrol-tank flap of which can be opened in a more convenient manner.

This object is achieved according to the invention by providing a petrol-tank flap arrangement for a motor vehicle, having a pivotably mounted petrol-tank flap which is retained in its closed position by a locking device, wherein the petrol-tank flap is assigned a driving device which enables the petrol-tank flap to automatically swing open into its refuelling position after the locking device is released.

Advantageous refinements of the invention can be gathered from the specification and the claims.

In the case of the petrol-tank flap arrangement according to certain preferred embodiments of the invention, the petrol-tank flap is assigned a driving device which enables the petrol-tank flap to automatically swing open into its refuelling position in a more convenient manner after the locking device is released. In this case, the locking device can be released both by direct actuation of the petrol-tank flap and by remote actuation from the interior of the motor vehicle.

It has proven particularly convenient according to certain preferred embodiments of the invention to smooth the opening movement of the petrol-tank flap by means of a damping element. The opening movement can be undertaken here by a spring energy store which can be regenerated in a simple and reliable manner when the petrol-tank flap is swung shut.

A push—push lock of the locking device has proven to be particularly worthwhile in the case of the direct actuation of the petrol-tank flap in order to open it according to certain preferred embodiments of the invention. In this case, the petrol-tank flap can also be locked via the central locking system of a motor vehicle by means of a tappet element which is secured axially by an additional, mechanical securing means.

Further advantages, features and details of the invention emerge from the following description of a preferred exemplary embodiment and with reference to the drawings.

Other objects, advantages and novel features of the present invention will become apparent from the following detailed description of the invention when considered in conjunction with the accompanying drawings.

BRIEF DESCRIPTION OF THE DRAWINGS

FIG. 1b is a plan view of the module of FIG. 1a;

FIG. 2 is a perspective view of a housing of the preassemblable installation module of the petrol-tank flap arrangement of FIG. 1a, the petrol-tank flap being omitted;

FIG. 3a is a perspective view of the petrol-tank flap of the FIG. 1a assembly, from which flap a tappet element protrudes;

FIG. 3b is a side view of the petrol-tank flap of FIG. 3a;

FIG. 6c is a sectional view through the locking device along the lines VId—VId in FIG. 5b; and FIG. 7 is a sectional view through the locking device along the line VII—VII in FIG. 5a.

DETAILED DESCRIPTION OF THE DRAWINGS

Figure 1A:
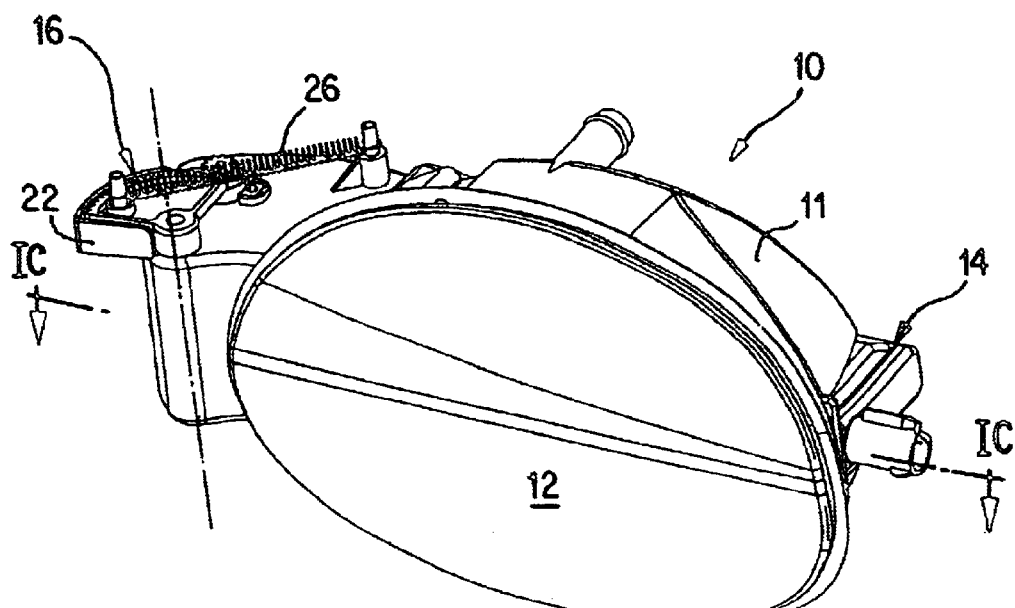
FIG. 1a is a perspective view of a preassemblable installation module of a petrol-tank flap arrangement according to preferred embodiments of the invention, which module comprises the petrol-tank flap, its pivoting mounting together with the driving device and the locking device.
Figure 1B:
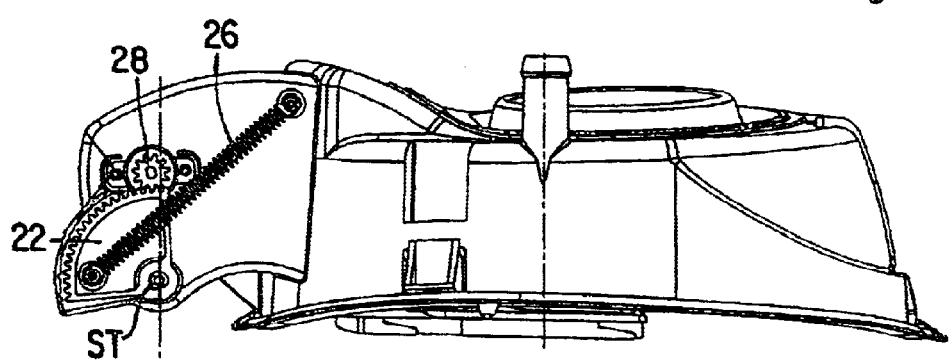
Figure 1C:
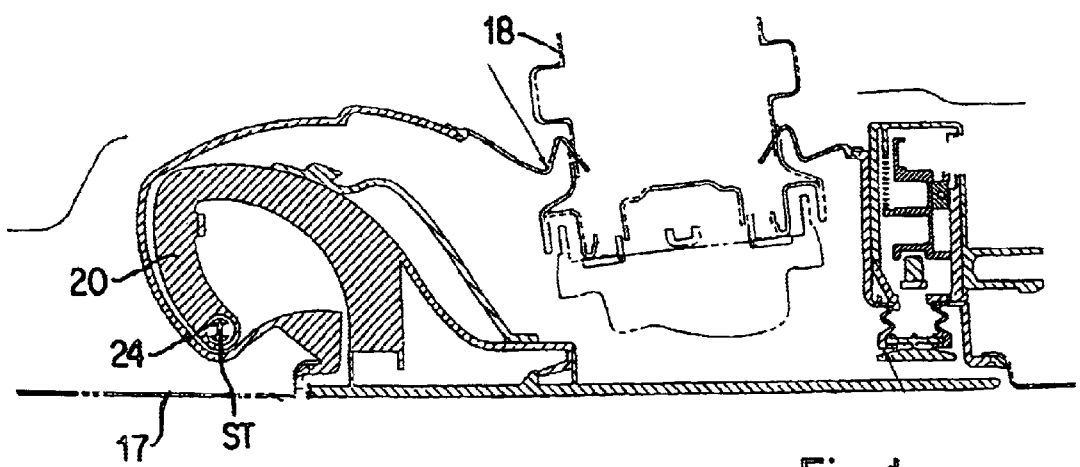
FIG. 1c is a section view of the module of FIG. 1a, taken along section line Ic—Ic.

FIGS. 1a to 1c illustrate an installation module 10 which can be preassembled with the petrol-tank flap arrangement, in a perspective view, in plan view and in a sectional view along the line Ic—Ic in FIG. 1a. The installation module 10 comprises essentially a housing 11, a petrol-tank flap 12, a locking device 14 for securing the petrol-tank flap 12 in its closed position, and a driving device 16 for automatically transferring the petrol-tank flap 12 from the closed position into a refuelling position. As can be seen in particular in FIG. 1c, the installation module 10 can be inserted into an opening of the body parts 17 of the motor vehicle in a manner such that it is flush with the surface and can be connected, for example, to a pipe 18 leading to the petrol tank. The petrol-tank flap 12 is mounted via an arm 20 on the housing 11 for pivotal movement about a pivoting axis ST running in the vertical direction of the vehicle. The petrol-tank flap 12 is deposited on a securing means on that side of the retaining arm which is inside the vehicle. In this case, the petrol-tank flap 12 can be supported with respect to the housing 11 via buffer elements.

After release of a locking device 14 which is still to be described below, the petrol-tank flap 12 can be opened automatically by means of a gearwheel element 22 of the driving device 16, the gearwheel element 22 being connected in a rotationally fixed manner to-the bearing spindle 24 of the petrol-tank flap 12. For this purpose, the gearwheel element 22 is spring-loaded in the opening direction of rotation by a spring energy device in the form of a helical tension spring 26 which can be regenerated or tensioned when the petrol-tank flap is swung shut. The opening movement of the petrol-tank flap 12 is smoothed by a damping element in the form of a rotationally damped pinion 28 which meshes with the toothing of the gearwheel element 22. The locking device 14 is arranged on that side of the petrol-tank flap 12 which is opposite the pivoting axis ST, in order to obtain a particularly functionally reliable lock.

FIG. 2 illustrates, in a perspective view, the housing 11 of the preassemblable installation module 10 of the petrol-tank flap arrangement shown without the petrol-tank flap 12. FIG. 2 shows, in particular, a large arm section 30 of the arm 20 (FIG. 1c) to which the petrol-tank flap 12 is to be fastened, for example by means of a latching connection. The housing 11 itself can likewise be fastened to the motor vehicle body by means of a latching connection or the like.

FIGS. 3a and 3b show a perspective view and a side view of the petrol-tank flap 12 having a counterpart 32 for the connection of the flap 12 to the arm section 30 of the arm 20 and also a tappet element 34 which protrudes from the rear side of the petrol-tank flap 12 and interacts with the corresponding locking device 14 in a manner still to be explained below. The tappet element 34 has a through hole 36 passing through it, in which a mechanical fastening pin additionally axially secures the tappet element 34 in the locking position of said tappet element, in which position it is inserted into the locking device 14. In order to avoid an ingress of water or dirt into the locking device 14, the tappet element 34 can be provided from the outside with a covering or similar seal.

Figure 4:
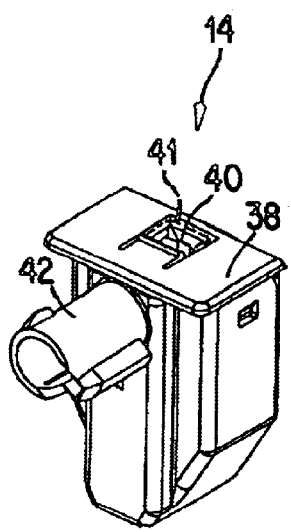
FIG. 4 is a perspective view of a locking device of the FIG. 1a assembly into which the tappet element of FIGS. 3a and 3b is inserted during a locking operation.
Figure 5A:
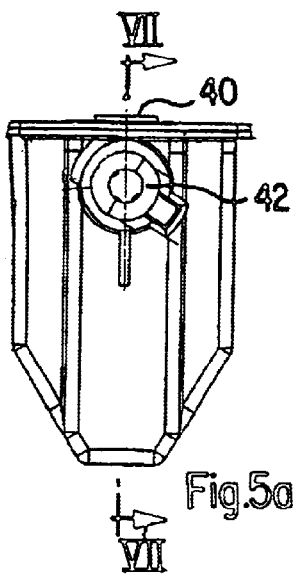
FIG. 5a is a front view of the locking device according to FIG. 4.
Figure 5B:
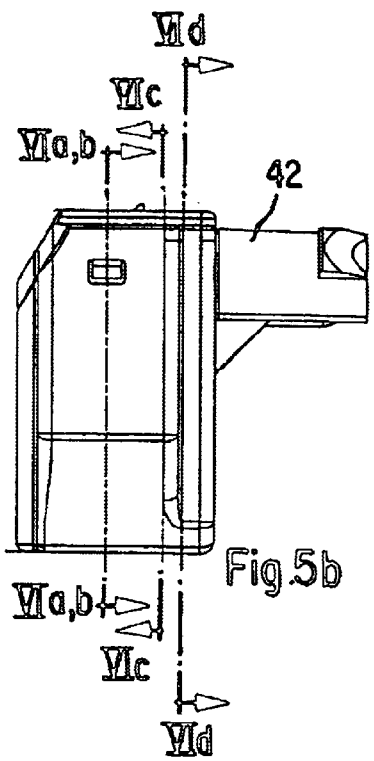
FIG. 5b is a side view of the locking device according to FIG. 4.

FIGS. 4, 5a and 5b show, in a perspective view, in front view and in side view, the locking device 14 which is fastened to the housing 11. At the top of the fastening housing 38 of the locking device 14 an insertion opening 40 can be seen, the tappet element 34 of the petrol-tank flap 12 being inserted through said opening into the fastening housing 38 during the locking operation. In order to avoid an ingress of water or dirt into the locking device 14, the insertion opening 40 is bounded by a seal 41 which seals the locking device 14 with respect to the tappet element 34. Furthermore, a hub flange 42 can be seen, via which a mechanical fastening pin, which can be actuated by a central locking system of the motor vehicle, passes through the fastening housing 38.

Figure 6A:
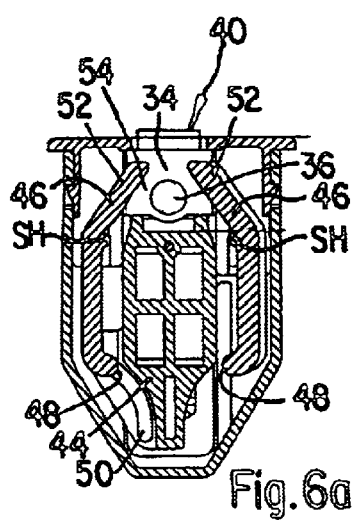
FIG. 6a is a sectional view through the locking device along the lines VIa—VIa in FIG. 5b.
Figure 6B:
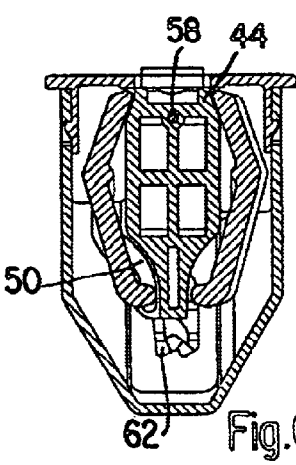
FIG. 6b is a sectional view through the locking device along the lines VIb—VIb in FIG. 5b.
Figure 6C:
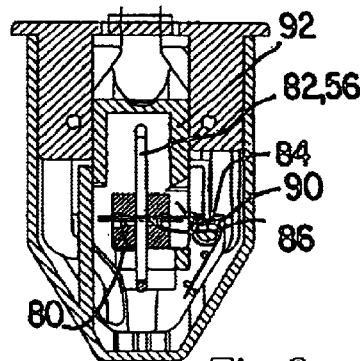
FIG. 6c is a sectional view through the locking device along the lines VIc—VIc in FIG. 5b.

FIGS. 6a to 6d illustrate sectional views through the fastening housing 38 of the locking device 14 along the lines VIa—VIa, VIb—VIb, VIc—VIc and VId—VId in FIG. 5b. FIG. 6a shows the fastening housing 38 with the tappet element 34 inserted therein via the opening 40 and secured. FIG. 6b shows the same section without the tappet element 34 inserted and secured. When the tappet element 34 is inserted, a control slide 44 is displaced by means of the tappet element 34 out of the position shown in FIG. 6b into the position shown in FIG. 6a counter to the spring force of the spring 33.

At the side of the control slide 44, within the fastening housing 38, two retaining arms 46 are attached to the fastening housing 38 in a manner such that they can pivot about the respective axis SH. At their end facing away from the tappet element 34 the retaining arms 46 comprise slotted-guide arms 48 which point downwards from the plane of projection in FIGS. 6a and 6b and interact with slotted guides 50 in the displaceable slide 44. When the slide 44 is displaced as the tappet element 34 is inserted, the slotted-guide arms 48 pass through the associated slotted guide 50, as a result of which the retaining arms 46 are pivoted about the respective axis SH. During insertion of the tappet element 34 the retaining arms 46 are pivoted in such a manner that front arm ends 52 of the retaining arms 46 grip in a form-fitting manner behind the tappet head 54 of the tappet element 34 and retain said tappet element in the closed position of the petrol-tank flap 12.

Figure 7:
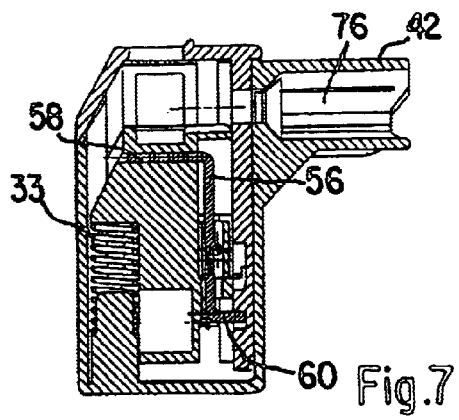
Figure 6D:
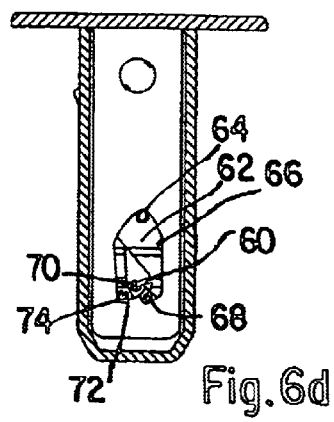

In order to implement the push—push lock, a Z-shaped spring 56 is provided, which spring can be seen in overall view in FIG. 7 and is mounted with a bent-off spring leg 58 pivotably on the slide 44. The further spring leg 60 on the other side of the spring 56 is guided within a further slotted guide 62 which can be seen in FIGS. 6b and 6d. If the slide 44 is in the position in which the tappet element 34 is not inserted—according to FIG. 6b, then the spring leg 60 is situated in the position indicated in FIG. 6d by the reference number 64. When the tappet element 34 is inserted, the spring leg 60 migrates along the slotted-guide flank 66 as far as a point 68 in which the tappet element 34 has caused the slide 44 to reach its completely inserted position. If, after being closed, the petrol-tank flap 12 is then released, the spring leg 60 migrates into the position 70 in which the petrol-tank lid 12 is secured in a locked manner. When the petrol-tank lid 12 is opened, the petrol-tank lid 12 and also the slide 44 are pressed slightly in the direction of the center of the vehicle on account of the push—push lock; for the spring leg 60 this means that it is pressed against the slotted-guide flank 72 and is moved in the direction of the position 74. From this position 74, the spring leg 60—and hence also the slide 44—can move freely in the direction of the starting position 64, and the tappet element 34 is released again to enable it to pivot open. The spring 33, which is prestressed in this position, is used for moving the slide 44 back.

In the position shown in FIG. 6a, the fastening pin (not shown) can be introduced into the opening 36 in the tappet element 34 and is, for its part, guided into the housing 38 via the opening 76 (FIG. 7) in the flange 42. The fastening pin is actuated here via the central locking system. The retaining arms 46 can be made from a plastic which is flexible such that should the push—push lock fail, the tappet head 54, which is gripped from behind by the arm ends 52, can be released from their grip by spreading apart the two arm ends 52 using an increased pulling-out force on the petrol-tank flap 12, and the petrol-tank flap 12 can be opened. In the case of an emergency unlocking of this type, the retaining arms 46 are not destroyed. If the mechanical fastening pin is in engagement with the through hole 36, the said pin has to be opened before the emergency unlocking, for example by means of an emergency actuation from the rear storage compartment of the motor vehicle.

In order to avoid an opening of the push—push lock under the influence of sudden acceleration forces, a mass-balancing part 80 (FIG. 6c) is provided. Such sudden acceleration forces on the petrol-tank flap 12 can arise, for example, during the journey or by means of washing brushes in a car wash. The mass-balancing part 80 is plugged onto the central leg section 82 of the Z-shaped spring 56 by means of a passage opening and is retained by a further spring 84. For this purpose, a spring leg 86 of the spring 84 passes through a further passage opening in the mass-balancing part 80. By means of the spring 84, the mass-balancing part 80 is held relative to the Z-spring 56 in such a position that the mass-balancing part 80 comes to lie level with an opening 90 in a wall 92 arranged at the side of it. In this rest position, the Z-spring 56 can be pivoted about its leg 58 by the mass-balancing part 80 entering into the opening 90. If the mass-balancing part 80 is deflected due to sudden acceleration forces, it is moved along the leg section 82 of the Z-shaped spring 56, this movement causing the mass-balancing part 80 to take up a different position relative to the opening 90. Since the mass-balancing part 80 can consequently not enter into the opening 90, the Z-shaped spring 56 can also not be pivoted about its leg 58. An inadvertent pivoting of the spring 56 due to the sudden acceleration forces—together with an unintentional release of the tappet head 54 as a result—is therefore made impossible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Petrol-tank flap arrangement for a motor vehicle, having a pivotably mounted petrol-tank flap which is retained in its closed position by a locking device, wherein the petrol-tank flap is assigned a driving device which enables the petrol-tank flap to automatically swing open into its refuelling position after the locking device is released and a gearwheel element which is connected in a rotationally fixed manner to a bearing spindle of the petrol-tank flap, wherein a rotationally damped pinion meshes as a damping element in toothing of the gearwheel element.

2. Petrol-tank flap arrangement according to claim 1, wherein the opening movement of the petrol-tank flap is smoothed by the damping element.

3. Petrol-tank flap arrangement according to claim 1, wherein the driving device comprises a spring energy store which can be regenerated when the petrol-tank flap is swung shut.

4. Petrol-tank flap arrangement according to claim 3, wherein a helical tension spring is provided as the spring energy store, said spring enabling the gearwheel element, to be spring-loaded in an opening direction of rotation.

5. Petrol-tank flap arrangement according to claim 1, wherein the locking device is arranged on a side of the petrol-tank flap, which is opposite its pivoting axis (ST).

6. Petrol-tank flap arrangement according to claim 1, wherein a preassemblable installation module is provided for the petrol-tank flap arrangement, said module comprising the petrol-tank flap, the pivot mounting thereof together with the driving device and the locking device.

7. Petrol-tank flap arrangement according to claim 5, wherein a tappet element protrudes from a rear side of the petrol-tank flap and interacts with the corresponding locking device.

8. Petrol-tank flap arrangement according to claim 7, wherein the locking device is designed as a push—push lock, the tappet element being inserted into a fastening housing of the push—push lock during the locking operation.

9. Petrol-tank flap arrangement according to claim 8, wherein the tappet element can be secured axially in its inserted locking position by an additional, mechanical securing means.

10. Petrol-tank flap arrangement according to claim 9, wherein the securing means is a fastening pin of a central locking system.

11. Petrol-tank flap arrangement according to claim 8, wherein the push—push lock is deactivated under the influence of sudden acceleration forces.

12. An assembly operable to selectively open and close a vehicle body opening to a fuel tank, comprising:

a body opening cover flap which is movable between a closed position closing a vehicle body opening and an open position uncovering the vehicle body opening to permit fueling access to a fuel tank, a locking device movable between a locking position locking the cover flap in the closed position and a release position releasing the cover flap from the closed position, wherein the locking device is operably controlled by a vehicle central locking system operable from inside the vehicle, and a cover flap driving device operable to automatically move the cover flap to the open position when the locking device is in the release position.

13. An assembly according to claim 12, wherein the locking device includes a movable locking pin engageable with a detent opening in a part carried by the cover flap.

14. An assembly according to claim 12, wherein said locking device is selectively operable by direct actuation at the cover flap and by remote actuation from within a vehicle with said assembly.

15. An assembly according to claim 14, wherein said cover flap driving device includes a spring which is tensioned by movement of the cover flap from the open position to the closed position.

16. An assembly according to claim 15, the locking device includes a movable locking pin engageable with a detent opening in a part carried by the cover flap.

17. An assembly according to claim 12, wherein said assembly includes a push—push lock operable by pushing on the cover flap.

18. An assembly according to claim 17, comprising a mass balancing part operable to avoid an opening in the push—push lock under influence of sudden acceleration forces.

19. An assembly operable to selectively open and close a vehicle body opening to a fuel tank, comprising:

a body opening cover flap which is movable between a closed position closing a vehicle body opening and an open position uncovering the vehicle body opening to permit fueling access to a fuel tank, a locking device movable between a locking position locking the cover flap in the closed position and a release position releasing the cover flap from the closed position, a cover flap driving device operable to automatically move the cover flap to the open position when the locking device is in the release position, and wherein said cover flap driving device includes a spring which is tensioned by movement of the cover flap from the open position to the closed position.

20. An assembly according to claim 19, wherein said cover flap driving device includes interengageable toothed gear sections.

21. An assembly according to claim 19, wherein the locking device includes a movable locking pin engageable with a detent opening in a part carried by the cover flap.

22. An assembly according to claim 21, wherein the locking pin is drivingly connected to a vehicle central locking system operable from inside a vehicle with said assembly.

* * * * *